Aug. 3, 1954
W. H. THOMPSON
2,685,137
DENTAL IMPRESSION TRAY CALIPER
Filed July 7, 1952
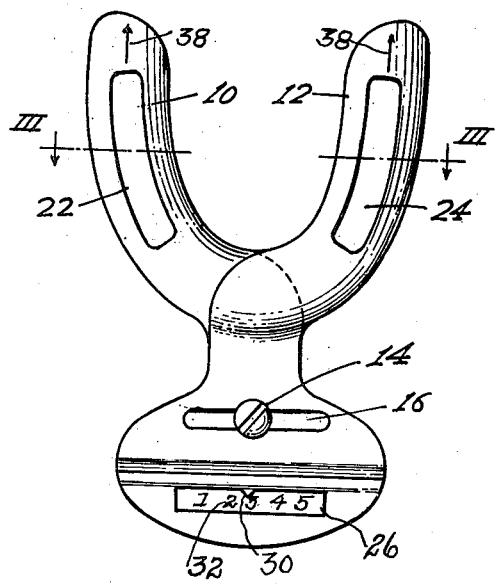
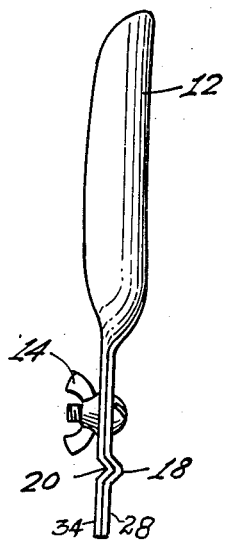
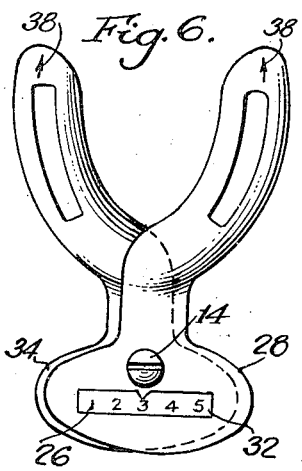
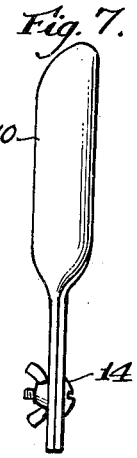
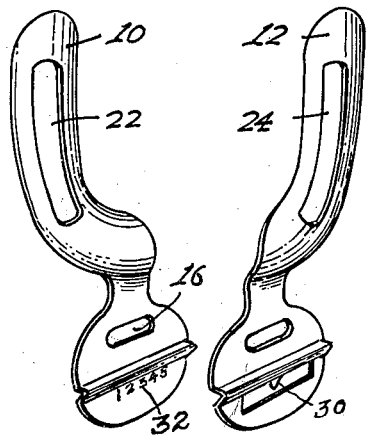
INVENTOR.
William H. Thompson.
BY
Christy, Parmelee and Strickland
ATTORNEYS:-

Patented Aug. 3, 1954

2,685,137

UNITED STATES PATENT OFFICE 2,685,137

DENTAL IMPRESSION TRAY CALIPER

William Houston Thompson, Pittsburgh, Pa.

Application July 7, 1952, Serial No. 297,447

4 Claims. (Cl. 33—174)

This invention relates to dental impression tray calipers. More particularly the invention relates to a caliper for measuring the size and shape of the upper and lower jaws of the human mouth to indicate size and type of tray to be used for obtaining impressions of the yaws for making false teeth plates.

At the present time dental impression trays are made in several sizes to provide trays that fit the different sizes and shapes of the human jaws. The trays are made on the assumption that the arch curvature of the U-shaped jaw is quite uniform for most humans the curvature varying in accordance with the width of the jaw. The trays are made to have the legs of the U longer than usually necessary in order to provide for the longest jaw requirement.

The trays are usually made of metal and it is quite common for the dentist to apply several trays on each jaw to find a tray of apparently the right size. When the tray is applied to the jaw, the tooth ridge is covered so that the dentist has to speculate on the size of tray to properly position the tray channel over the tooth ridge. If the jaw is not of an average shape, the tooth ridge may be at the side of the tray channel although the tray fully covers the jaw. Often an impression made with such a tray will not be satisfactory and must be made over.

The necessity of placing a series of trays in the mouth when learning the proper size of tray is not a sanitary operation and requires that all of such trays should be carefully sterilized before being used again.

The primary object of the present invention is to provide a caliper for measuring the jaws of a human to determine the size of a dental tray to be used for making a jaw impression.

Another object of the invention is to provide a caliper for measuring the jaws of a human to determine the size and shape of a dental tray to be used that will properly fit the tooth ridge line of the jaw.

A further object of the invention is to provide a caliper for measuring the size and shape of the jaws of a human which is comparatively light in weight and small in size to be easily adjustable in the mouth without distress to the patient.

With these and other objects in view, the invention consists in the dental tray caliper hereinafter illustrated and described and particularly defined in the appended claims.

The various features of the invention are illustrated in the accompanying drawings in which:

Fig. 1 is a top plan view of the dental tray calipers embodying the preferred form of the invention;

Fig. 2 is a view in side elevation of the calipers;

Fig. 3 is a vertical sectional view of the calipers taken on the line III—III of Fig. 1;

Figs. 4 and 5 are perspective views of the two measuring arms of the calipers with their adjusting plates; and Figs. 6 and 7 are a top plan view and a side view of a modified form of dental tray calipers which have flat handles to permit the caliper arms to be pivotally adjusted to make width measurements of jaws.

The preferred caliper is made of two arms 10 and 12 which are shaped to overlap one another and form a U-shape. The rear face of the arms 10 and 12 have a channel groove which is adapted to fit over the ridge of the jaw. The arms 10 and 12 are held together by means of a clamping bolt 14 which is fitted in a slot 16 formed in each of the arms. The arms are made of lightweight metal which are comparatively narrow that are projected into the mouth to fit over the gums of the jaw. Each arm has a rearwardly extending adjusting plate or handle which extend out of the mouth and form a means by which the arms may be adjusted from the outside in fitting the caliper to the jaw. Guides 18 and 20 are formed in the rearwardly extending plates which fit together and limit the adjustment of the arms to one in which the arms are held in parallel relation. The slot 16 also assists in maintaining the parallel relationship of the arms in adjusting the arms to different sizes of jaws. An opening 26 is formed in the upper plate 28 which has a pointer 30 which moves over a series of graduations 32 formed on the face of the lower plate 34. The graduations 32 are arbitrary graduations which are used to indicate the size of dental tray which corresponds to the measurements made by the caliper.

Slots 22 and 24 are formed respectively in the face of the arms 10 and 12 which form a window through which the tooth ridge of the jaw may be observed when the arms are in position over the jaws. These windows are very important in allowing the proper adjustment of the arms to be made in selecting the proper size of tray for making an impression of the jaws in order to have the center of the tray channel accurately fit over the tooth ridge of the jaw.

In Figs. 6 and 7 are illustrated a modified form of calipers which provide pivotal adjustment of the arms 10 and 12 about the clamping pivot 14 to measure irregularly-shaped jaws. The handle portions 28 and 34 of the arms 12 and 10 respectively are flat so that the handles and arms may be pivotally adjusted about the pivot clamp 14. The pivotal adjustment permits the arms to be moved to accurately bring the slots 22 and 24 into registry with the tooth ridge of the jaw. To use the calipers shown in Figs. 6 and 7 the arms 10 and 12 are adjusted along the slots 16 to fit the base of the caliper U to the front of the jaw. The clamp 14 is then tightened and the arms are pivotally adjusted about pivot 14 to bring the openings 22 and 24 into register with the tooth ridge. The graduations 32 are used for the normal shaped jaws, but when pivotal adjustments of the arms are necessary, index marks 38 near the outer ends of the arms provide a measurement which can be made by the dentist after the calipers are withdrawn from the mouth to determine with the graduations 32 the size and shape of the tray to be used for special shaped jaws or special positions of the tooth ridge.

Preferably the caliper will be made of thin light material such as stainless steel which will have smooth edges in order to avoid irritation to the patient's mouth. In place of metal the caliper may be molded from a transparent resin which is capable of being sterilized. One such resin is allyl diglycol carbonate. With a transparent resin the entire course of the tooth ridge may be observed in adjusting the caliper for determining the tray size. Since the caliper has to be sterilized after each time that it is used, it is necessary to have a resin that will not be softened or deformed when heating it to a sterilizing temperature.

The calipers are also useful for forming and shaping a wax bite which is used by dentists for making tooth impressions. With the calipers the wax bite may be accurately shaped to fit over the teeth to get a good and complete impression.

The preferred form of the invention having thus been described what is claimed as new is:

1. A dental jaw caliper comprising a pair of measuring arms, each arm having a curved base and a handle offset from and substantially parallel to the arm, the handle of one arm positioned on top of the handle of the other arm to form a U-shaped measuring instrument, the arm and base portions being channelled to rest over the ridge of the human mouth jaw, said handle portions having slots therein which register when the measuring arms are assembled and extend substantially perpendicular to the arms to allow the arm portions to be moved toward and away from one another to locate the channeled arms to fit over the ridge of the jaw, a clamping pivot located in said slots to hold the arms in adjusted position, and an indicator in one handle to show the adjusted size of the measuring arms by a scale on the other handle.

2. The calipers defined in claim 1 in which an opening is formed in the midportion and extending through the major part of the length of the arm to expose the location of the tooth ridge of the jaw by which the arms may be adjusted to locate the opening over the tooth ridge.

3. The caliper defined in claim 1 in which meshing guides are formed in the handles to maintain the arms parallel while being adjusted.

4. The caliper defined in claim 1 in which the arms and handles are flat to permit the arms to be adjusted in parallel relation and pivotal relation about the pivot clamp to adjust the arms to measure the size and shape of the jaw at the tooth ridge.

References Cited in the file of this patent

UNITED STATES PATENTS

| Number | Name | Date |
| --- | --- | --- |
| 37,531 | D. Talbot | June 27, 1863 |
| 607,295 | W. Talbot | July 12, 1898 |
| 1,213,607 | Engelsman | Jan. 23, 1917 |
| 2,456,806 | Wolffe | Dec. 21, 1948 |